3,318,859
PROCESS FOR THE PREPARATION OF POLYPROPYLENE

Eduard H. Adema, Beek, and Johannes B. M. Laauwen and Johannes C. Soeterbroek, Geleen, Netherlands, assignors to Stamicarbon N.V., Heerlen, Netherlands
No Drawing. Filed Oct. 17, 1963, Ser. No. 317,076
Claims priority, application Netherlands, Oct. 26, 1962, 284,799
15 Claims. (Cl. 260—93.7)

The invention concerns a process for stereospecific polymerisation of propylene. By "stereospecific polymerisation of propylene," as used in the present specification, is to be understood the homopolymerisation of propylene to a product with a high percentage of isotactic polypropylene, the copolymerisation of propylene with so little (at most 10 mol.-percent) of one or several other monomers, such as ethylene, butylene-1, butadiene and isoprene, that substantially crystalline polymer is obtained, and also the heteroblock polymerisation of propylene with one or several other monomers, for example with those mentioned above, to heteroblock polymers whose polypropylene segments, with the inclusion of the segments (if any) composed of the other monomer or other monomers, are for the most part isotactic in structure.

It is known that a catalyst consisting of violet titanium trichloride and a trialkylaluminium compound or a dialkylaluminiummonohalide is very suited for use in the preparation of highly isotactic polypropylene. A catalyst consisting of titanium trichloride and an alkylaluminiumsesquihalide, i.e., a mixture of equimolecular amounts of dialkylaluminiummonohalide and monoalkylaluminiumdihalide, gives a much lower polymerization rate and a considerably lower content of isotactic polypropylene. This can be accounted for by the fact that the monoalkylaluminiumdihalide acts as inhibitor in the polymerization, as is known from the German Auslegeschrift 1,058,736. Consequently it is not surprising that a combination of titanium trichloride and a monoalkylaluminiumdihalide only does not possess any catalytic activity at all.

In the Belgian patent specification 594,407 it has been disclosed that the activity and the stereospecificity of a catalyst composed of titanium trichloride and an alkylaluminiumsesquihalide can be increased by addition of organic compounds, such as amines, ethers and thioethers, which can bind the halogen compound of the cheap sesquihalide by complex-formation. This view is obviously based on the concept that the said inhibiting effect of the dihalide is thus counteracted, with the result that the proper catalytic effect of the monohalide is preserved.

Furthermore it is a known practice in the polymerization of alkenes carried out with the aid of catalysts consisting of, possibly halogenated, hydrocarbon compounds of metals of the second subgroup or the third maingroup and halogen compounds of metals of the fourth, fifth or sixth subgroup of the periodic system, to add also compounds which, together with the catalyst components, can form complexes, such as compounds containing ethers, nitriles, acetals, amines, quaternary ammonium salts and hydroxyl groups the said complex-forming compounds being preferably applied in amounts of 0.2–0.5 mol per mol of the metal hydrocarbon compound (see Belgian patent specification 554,242). As to the polymerization of propylene this patent specification particularly recommends the use of halogen-free alkylaluminium compounds, the procedures described in the examples using vanadium tetrachloride as halide of the transition metal. This patent specification furthermore does not aim at the preparation of isotactic polypropylene, but only at reducing the formation of low-molecular oily products. Hence, it suggests by no means that the special catalyst system according to the invention described below, which contains only one given combination of the great many combinations of metal hydrocarbon compounds, halogen compounds of the metals of the 4th, 5th or 6th subgroup and complex-forming compounds that are possible according to the Belgian Patent Specification should be eminently suited for the stereospecific polymerization of propylene.

The process according to the present invention concerns the stereospecific polymerization of propylene by means of a catalyst containing a hydrocarbon compound of a metal of the second subgroup or of the third main group, a halogen compound of a metal of the fourth, fifth or sixth subgroup of the periodic system of the elements and a complex-forming compound, and is characterized in that the catalyst contains a monoalkylaluminiumdihalogenide, violet titanium trichloride and an ether having the formula $R_1$—O—$R_2$, where $R_1$ represents an alkyl or aralkyl and $R_2$ is an alkyl, aryl, aralkyl, or alkaryl, the ether and the monoalkylaluminiumdihalogenide being employed in a molar ratio equal to 0.65–2.5.

This process has the advantage that the monoalkylaluminiumdihalides used are cheaper and less inflammable than trialkylaluminium compounds and dialkylaluminiummonohalides.

The process according to the present invention can be carried out under the conditions normally used for this type of polymerization reactions. The temperature may range from 0 to 250° C. and the pressure from 1 to 100 atm., or higher. Temperatures of 30–100° C., preferably of 40–80° C., and pressures below 20 atm., particularly 1–12 atm., are preferred.

The polymerization is preferably carried out in an inert liquid dispersing agent. Examples of suitable dispersing agents are saturated hydrocarbons, such as hexane, heptane or cyclohexane. Other suitable dispersing agents are for instance gasolene, kerosene, and benzene.

The catalyst may contain the alpha, the gamma or the delta modification of the violet titanium trichloride and also other crystalline modifications, in which also another metal halide, for example $AlCl_3$, may be present, if desired in solid solution. If desired, the titanium trichloride may be prepared by reacting titanium tetrachloride with an excess of monoalkylaluminiumdihalide at a temperature of, e.g., 20–120° C. It need not be recovered from the reaction mixture, as the latter, after being heated if so desired, can be used as such. By preference, a chloride, bromide, or iodide with an alkyl radical containing 1–12 carbon atoms, is used as monoalkylaluminiumdihalide.

The ethers to be used may be symmetrical and asymmetrical aliphatic as well as mixed aliphatic-aromatic ethers. Examples of suitable ethers are diethylether, di-(n-butyl)-ether, diisopropylether, diisoamylether, anisole and phenylethylether. The ethers normally contain 2–24 carbon atoms. By preference use is made of aliphatic ethers, as these have the highest activity and yield the largest percentage of isotactic polypropylene. Diisopropylether, di-n-butylether, and diisoamylether in particular give very good results.

The polymerization can be carried out in one of the known ways, for instance by introducing the propylene, at the required temperature and pressure into an inert, liquid dispersing agent in which the catalyst according to the invention is already present, or by saturating the dispersing agent with the propylene and then adding the catalyst to it. The polymerization may furthermore be carried out as a batch process, a semi-continuous, or a continuous process.

The violet titanium trichloride the monoalkylaluminiumdihalide, and the ether may be separately introduced into the polymerization reactor in any order desired. It is also possible first to feed two of the three catalyst components, for instance the titanium trichloride and the dihalide, into the dispersing agent, allow them to react at room temperature or higher temperatures, for instance at 40–100° C., and then to introduce the monomer, and, finally, add the third component. During the reaction between the first two components these may be present in higher concentrations than during the polymerization reaction. Furthermore, the three catalyst components may, prior to being fed to the polymerization reactor, be allowed to react with each other for sometime. This reaction may be carried out at room temperature but also at lower or higher temperatures, for instance at those used in the polymerization. Preferably, this reaction is carried out at a concentration higher than that at which the catalyst is present during the polymerization, with the result that the preparation of the catalyst is accelerated.

The concentrations of the catalyst components during the polymerization may vary between wide limits. As a rule, the concentration of the violet titanium trichloride is between 2 and 20 mmoles per litre of the dispersing agent, while the molar ratio between the monoalkylaluminiumlihalide and the violet titanium trichloride usually ranges from 5 to 0.5. The molar ratio ether : monoalkylaluminiumdihalide is preferably 0.95–1.5 because the activity of the catalyst is greatest in this region. The most favourable results are obtained with equimolecular amounts of ether and monoalkylaluminiumdihalide. This is because under the said conditions the activity is considerably greater than at a ratio of say 0.9.

By using the process according to the invention, polymers which are predominantly isotactic in a number of cases even up to over 95% can be obtained from propylene.

EXAMPLE 1

Into a 150-ml. reaction vessel provided with a stirrer and placed in a thermostat 50 ml. of dried, oxygen-freed heptane were introduced under nitrogen. After that, the contents of the vessel were heated to 50° C., which temperature was maintained throughout the experiment. After 4.6 mmoles of $\alpha$-TiCl$_3$ had been added, propylene was passed through the reaction vessel until the nitrogen has been displaced by the propylene. Next, 4.6 mmoles of monoethylaluminiumdichloride and 4.6 mmoles of di-(n-propyl)ether were added in succession. After that, propylene was fed into the reaction vessel for 5½ hours, the propylene pressure being kept at about 1 atm. The reaction was stopped by adding 50 ml. of methanol and 20 ml. of hydrochloric acid to the reaction mixture, which was kept at 50° C. for another hour. The reaction mixture was then separated into two layers. The heptane layer, which contained the polymer, was washed with methanol and hydrochloric acid and after that completely dried by evaporation. The polypropylene, left as residue, was dried and weighed (2.4 g.). To determine the content of isotactic polypropylene, this residue was extracted on a steam bath with 100 ml. of hexane for 72 hours. 2.1 g. of the product were not dissolved in this treatment. Consequently, the percentage of isotactic polypropylene was 87%.

Using the same procedure, a number of experiments were made in which other ethers were added. The results are shown in Table I, which, by way of comparison, also includes an experiment in which diethylaluminium-monochloride was used without addition of an ether.

TABLE I

| $C_2H_5AlCl_2$, mmoles | $\alpha$-TiCl$_3$, mmoles | Ether, mmoles | Reaction time, hours | Total amount of polymer, g. | Isotactic product, percent |
|---|---|---|---|---|---|
| 4.6 | 4.6 | ---------- | 6 | 0 | ---------- |
| 4.6 | 4.6 | 4.6 n-propyl--- | 5.5 | 6.9 | 95 |
| 2.0 | ¹2.0 | 2.0 isopropyl-- | 5 | 15.1 | 97 |
| 4.7 | 4.7 | 4.7 isopropyl-- | 5.5 | 17.0 | 96 |
| 4.7 | 4.7 | 9.4 isopropyl-- | 5 | 4.0 | 95 |
| 3.8 | 3.8 | 3.8 isoamyl---- | 5 | 11.5 | 94 |
| 4.6 | 5.1 | 4.6 anisole---- | 4 | 3.4 | 90 |
| 5.5 | 5.9 | 5.5 n-butyl---- | 5 | 13.1 | 97 |
| 4.6 | 4.25 | 4.6 ethyl------ | 5 | 5.9 | 94 |
| 4.6 | 3.75 | 4.6 phenetole-- | 4.5 | 3.7 | 95 |
| ²3.7 | 3.7 | ---------- | 4 | 10.9 | 95 |

¹ The TiCl$_3$ used in this test was obtained by reduction of TiCl$_4$ with aluminium.
² $(C_2H_5)_2AlCl$.

EXAMPLE 2

Into a 2 l. autoclave provided with a stirrer, 1 l. of dried heptane was introduced, after which 15 mmoles of diisopropylether 15 mmoles of monoethylaluminiumdichloride, and 15 mmoles $\alpha$-TiCl$_3$ were added in sucsession at 50° C., all operations being carried out with exclusion of air. Next, dry, oxygen-free propylene was fed into the autoclave, while the temperature in the autoclave was kept at 50° C. and the pressure at 4 atm. by continuously supplying propylene.

After 2 hours the resulting polymer suspension was transferred to a stirring vessel in which the catalyst was decomposed by addition of methanol. The product was treated as described in Example 1. The total polypropylene yield was 120 g., 116.5 g. of which, i.e. 97%, was insoluble in boiling hexane. The density of this isotactic product was 0.907.

EXAMPLE 3

Following the procedure outlined in Example 2, a number of tests were performed at a temperature of 65° C. and a pressure of 2.5 atm., in which di-(n-butyl)ether was used as the ether, and the concentrations of the catalyst components were varied. In a number of experiments the ether was previously added to the monoethyl-aluminiumdichloride.

This mixture was subsequently contacted with the TiCl$_3$ in the polymerization reactor in the absence of propylene. The TiCl$_3$ was prepared by reduction of TiCl$_4$ with aluminium. The results obtained are compiled in Table II.

TABLE II

| Test No. | Catalyst components mmol/l. | | | Reaction time (h.) | Total yield of polymer g./l. | Isotactic product, percent |
|---|---|---|---|---|---|---|
| | $C_2H_5AlCl_2$ | $TiCl_3$ | $(C_4H_9)_2O$ | | | |
| 1 | 5 | 5 | 4.8 | 2 | 65 | 93 |
| 2 | 5.5 | 5 | 5.2 | 1.5 | 59 | 95 |
| 3 | 6 | 5 | 5.7 | 1.5 | 72 | 94 |
| 4 | 11 | 5 | 10.5 | 1.5 | 90 | 95 |
| 5 | 11 | 5 | 10.5 | 1 | 61 | 95 |
| 6 | 5 | 10 | 5 | 2 | 82 | 94 |
| 7 | 10 | 10 | 10 | 2 | 114 | 95 |

We claim:

1. Process for the stereospecific polymerization of propylene characterized in that a catalyst is prepared from a monoalkylaluminumdihalide, violet titanium trichloride and an ether of the formula $R_1$—O—$R_2$, where $R_1$ represents alkyl or aralkyl and $R_2$ is an alkyl, aryl, aralkyl or alkaryl, the ether and the monoalkylaluminiumdihalide being employed in a molar ratio between 0.65:1 and 2.5:1.

2. Process according to claim 1, characterized in that the ether and the monoalkylaluminium dihalide are used in a molar ratio between 0.95:1 and 1.5:1.

3. Process according to claim 2, characterized in that equimolecular amounts of ether and monoalkylaluminiumdihalide are used.

4. Process according to claim 1, characterized in that use is made of an aliphatic ether.

5. Process according to claim 4, characterized in that the ether is diisopropylether.

6. Process according to claim 2, characterized in that use is made of an aliphatic ether.

7. Process according to claim 3, characterized in that use is made of an aliphatic ether.

8. Process according to claim 6, characterized in that the ether is diisopropylether.

9. Process according to claim 7, characterized in that the ether is diisopropylether.

10. Process according to claim 4, characterized in that the ether is di-(n-butyl) ether.

11. Process according to claim 6, characterized in that the ether is di-(n-butyl) ether.

12. Process according to claim 7, characterized in that the ether is di-(n-butyl) ether.

13. Process according to claim 4, characterized in that the ether is diisoamylether.

14. Process according to claim 6, characterized in that the ether is diisoamylether.

15. Process according to claim 7, characterized in that the ether is diisoamylether.

References Cited by the Examiner

UNITED STATES PATENTS 3,189,585  6/1965  Shearer _____ 260—88.2

FOREIGN PATENTS 809,717  3/1959  Great Britain.
1,310,774  11/1961  France.

JOSEPH L. SCHOFER, Primary Examiner.

JAMES A. SEIDLECK, Examiner.

M. B. KURTZMAN, Assistant Examiner.